(No Model.)
E. R. WILDER.
CENTRAL STATION APPARATUS FOR CALL BOXES.
No. 460,767. Patented Oct. 6, 1891.
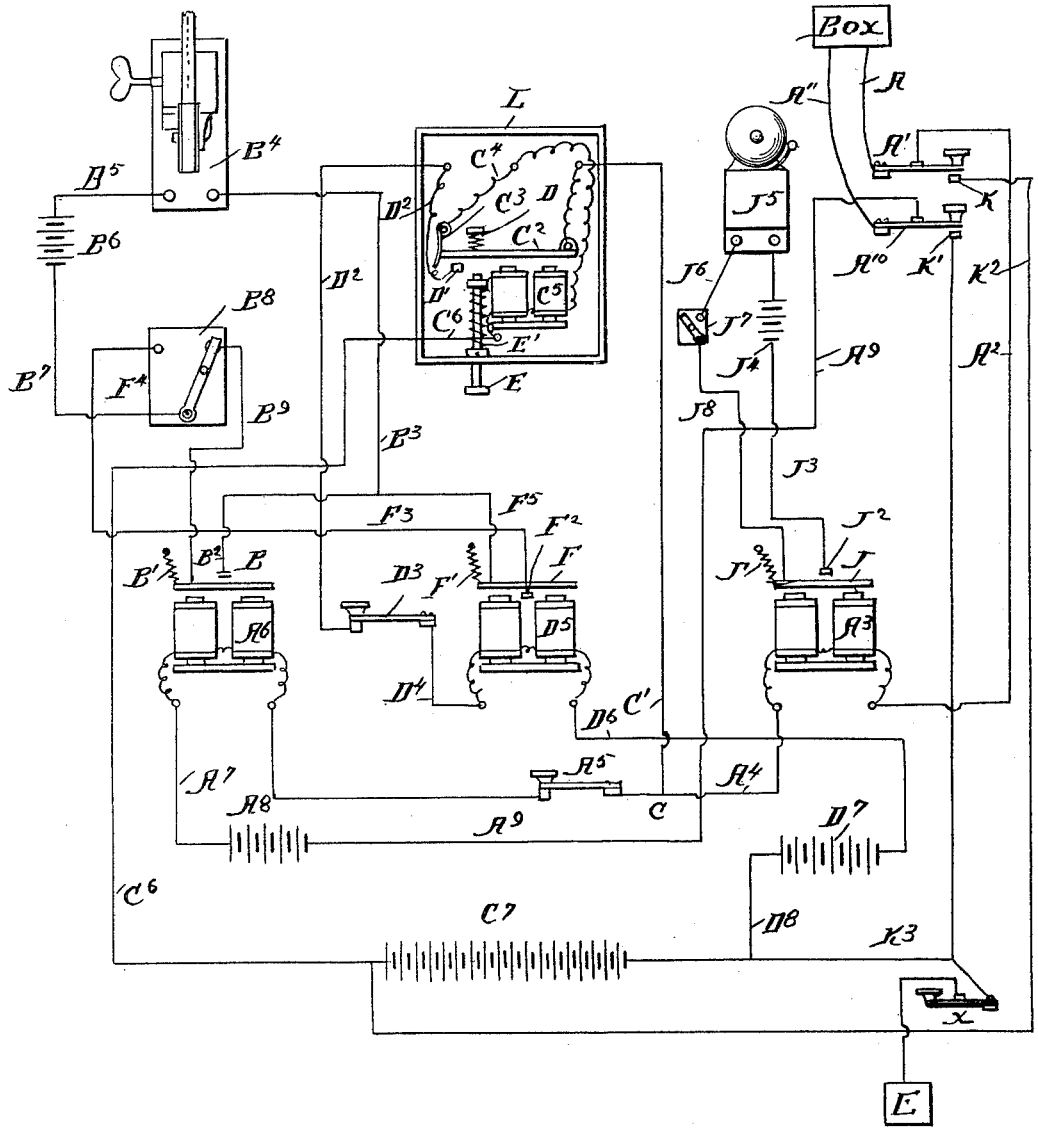
Witnesses:
Celeste P. Chapman
Jean Elliott
Inventor
Edmund R. Wilder
Barnes W. Parker,
Attorney.

UNITED STATES PATENT OFFICE.

EDMUND R. WILDER, OF KANSAS CITY, MISSOURI.

CENTRAL-STATION APPARATUS FOR CALL-BOXES.

SPECIFICATION forming part of Letters Patent No. 460,767, dated October 6, 1891.

Application filed January 2, 1891. Serial No. 376,546. (No model.)

*To all whom it may concern:*

Be it known that I, EDMUND R. WILDER, a citizen of the United States, residing at Kansas City, in the county of Jackson and State of Missouri, have invented a certain new and useful Improvement in Central-Station Apparatus for Call-Boxes, of which the following is a full, clear, and exact specification.

My invention relates to central-station apparatuses and connections for use with call-boxes, messenger-boxes, and the like, and has for its object to provide certain convenient and simple arrangements whereby the call may be received over either a metallic circuit or a ground-circuit, and whereby an alarm-call may be received in the event of the ground-circuit being inoperative, and whereby the call-signal may be received over the ground-circuit in the event of the metallic circuit being inoperative.

My invention is illustrated in the accompanying drawing, wherein—

A is a metallic conductor leading from the call-box to the double contact-key $A'$, thence by conductor $A^2$ to the relay $A^3$, thence by conductor $A^4$ to the switch $A^5$ to the relay $A^6$, thence by conductor $A^7$ to the battery $A^8$, and along conductor $A^9$ to the double contact-key $A^{10}$, and by the conductor $A^{11}$ back to the box. Thus a metallic circuit, including the battery $A^8$ at the station, is made connecting the box with the central station. The relay $A^6$ has the pivoted armature B and the counteracting spring $B'$ and the contact $B^2$, from which leads the conductor $B^3$ to the register $B^4$, thence by conductor $B^5$ to the local battery $B^6$, and conductor $B^7$ to switch $B^8$, and thence on conductor $B^9$ back to the armature B, whereby a local circuit containing a battery and registry is provided, and the same is capable of being opened or closed by the action of the metallic circuit on the relay $A^6$. In this manner, when the box is giving this signal, it is evident that the signal will be registered.

To start the box it is necessary to have an extra current of sufficient strength to energize its starting mechanism, and this current is obtained on a grounded circuit, the metallic portions thereof being either or both of metallic conductors A $A^{11}$. This circuit includes also a suitable battery to furnish sufficient current for the purpose indicated. We will now trace the circuit. Beginning with the conductor A, we pass to the key $A'$, conductor $A^2$, relay $A^3$, conductor $A^4$ to the point C, thence on conductor $C'$ to the armature $C^2$, to the spring-contact $C^3$, conductor $C^4$, magnets $C^5$, conductor $C^6$ to battery $C^7$, and thence to the earth at the central station, the circuit being completed through the earth to the box; and if we follow the other circuit, assuming the metallic portion of such ground-circuit to be $A^{11}$, it is as follows: The key $A^{10}$, conductor $A^9$, battery $A^8$, conductor $A^7$, relay $A^6$, key $A^5$ to the point C, and thence complete the circuit, as last above shown. Thus it is plain that the starting-circuit for the box, which includes the battery $C^7$ at the central station, is a ground-circuit, the metallic portion of which may be either one or both of the metallic conductors connecting the box and central station. When this ground-circuit is closed, which is the first action taken by the user in operating the box, the current in the circuit, as last above traced, passes through the magnet $C^5$ and draws down the armature $C^2$, which is then held in contact by spring D with the contact-point $D'$, and the current passes thence along the conductor $D^2$ to the key $D^3$, along the conductor $D^4$ to the relay $D^5$, thence by the conductor $D^6$ to the battery $D^7$, by the conductor $D^8$ to the ground.

The action of starting the box consists in momentarily closing the circuit through the magnet $C^5$ and switching the battery $C^7$ into the ground-circuit, and this starts the box. Immediately upon the starting of the box the current which effects such starting also, as last above shown, by drawing down the armature $C^2$, switches out the battery $C^7$ and switches in the battery $D^7$ into the ground-circuit between the box and the station. This condition of things continues until the armature $C^2$ is restored to its position by pressure upon the button E upon the spring-encircled rod $E'$, which restores the armature to the position shown in the drawing, where it is held in frictional contact with the spring $C^3$. Until the central-station operator takes this action the current will flow over the circuit last described and through the relay $D^5$. Forming a part of this relay is the armature F with the retracting-spring F', the contact $F^2$ from which leads the conductor $F^3$ to the switch $F^4$, and the switch may be placed so that this circuit may continue through the switch on the conductor $B^7$, thence through battery $B^6$, conductor $B^5$, register $B^4$, conductor $B^3$, by conductor $F^5$, back to the armature F, thus forming a local circuit, including the battery $B^6$ and the register $B^4$, which circuit is controlled by the relay $D^5$. In other words, the signal will thus be given over the ground-circuit, and if the metallic circuit is broken or disconnected so that the relay $A^6$ will not be operated the ground-circuit by the action of the relay $A^5$ will give the signal.

If there should be a ground on one of the metallic conductors, the ground-circuit between the box and the central station is evidently thrown out, so that the battery $C^7$ cannot be thrown into circuit to operate or start the box by the usual ground-circuit connections. In this event the operation is as follows: The relay $A^3$ is highly adjusted so that it holds its armature J in equilibrium so long as the normal current from the battery $A^3$ is flowing over the metallic circuit connecting the box to the station. If now a resistance be thrown into circuit at the box, for which provision has been made in my call-box, the strength of the current flowing through $A^3$, and hence the pull, will be diminished, and the armature J will be drawn by the spring J' against the contact $J^2$. Thus a local circuit will be made as follows: from contact $J^2$ along conductor $J^3$, through battery $J^4$, through the vibratory bell $J^5$, along conductor $J^6$, through the switch $J^7$, along conductor $J^8$ back to the armature. If the switch $J^7$ be closed, as it normally would be, the introduction of the resistance into the metallic circuit of the box would thus close the local circuit and cause the bell $J^5$ to give an alarm or call, which shows that a box connected with this central station has been set for a call, but that it requires the introduction of a sufficient battery at the central station to permit the box to start and also that this battery must be introduced into the metallic circuit as the ground-circuit has been rendered useless. This is accomplished as follows: The two keys $A^1$ $A^{10}$ are compressed upon their contacts K K' and a circuit is thus formed embracing the box and the metallic conductors A $A^{11}$ and traced as follows: From conductor A to key A', contact K, conductor $K^2$, battery $C^7$, conductor $K^3$ to contact K', key $K^{a10}$. This evidently throws the battery $C^7$ into the metallic circuit and furnishes a sufficient circuit to start the box, and of course the keys A' $A^{10}$ are immediately released and the contact broken. The signal then comes in over the metallic circuit and is registered by means of the relay $A^6$ and its local circuit.

The mechanism inclosed in the case L, I have termed a "battery-changer." As heretofore shown, if the parts are all in their normal condition and a box be started to give a signal, the armature $C^2$ of the battery-changer will be drawn down and the battery $C^7$ will be thrown out of circuit and the battery $D^7$ into circuit, and it will remain in this condition until the operator pushes up the button E. So long as it is in this condition, however, it is impossible for any other box to be operated so as to switch the battery $C^7$ into its circuit and start itself. If one of the metallic conductors between the station and the boxes should be grounded, the battery-changer will operate and the same result will follow, so that it is impossible for more than one box to signal at the same time; and after the box-signal has been received of any given box it is the duty of the operator to push the button E up and restore the box into the position shown in this drawing, whereupon the next box may give in a signal. If the battery-changer has been caused to operate by reason of a ground on the metallic conductor between the box and the central station, it is the duty of the operator upon discovering that fact, which he will know by the continued closing of relay $D^5$ and the absence of a signal, to move the key $D^3$, thus leaving but one ground on the metallic circuit, and hence leaving the metallic circuit in condition to operate, as heretofore shown.

The key X is interposed between the earth at the station and the junction of the two conductors $D^8$ and $K^3$, and can be used to cut out the entire earth connection at the station.

I claim—

1. In a central-station apparatus for call-boxes, the combination of a registering mechanism, a metallic circuit from the box to the station, a register-controlling device in such station, a starting-battery at the central station, and a ground-circuit from the station to the box, the metallic portion of which is the metallic connection from the box to the station, and which circuit includes the starting-battery and a battery-changer, whereby the starting-battery is switched out after a momentary connection and a signaling-battery switched in.

2. In a central-station apparatus for call-boxes, the combination of a registering mechanism, a metallic circuit from the box to the station, a register-controlling device in such station, a starting-battery at the central station, and a ground-circuit from the station to the box, the metallic portion of which is the metallic connection from the box to the station, and which circuit includes the starting-battery and a battery-changer, whereby the starting-battery is switched out after a momentary connection, and a signaling-battery switched in and a register-controling device in circuit with the last-named battery, so that the signal is received at the central station and registered by the current flowing over either the metallic circuit or the ground-circuit.

3. In a central-station apparatus for call-boxes and the like, the combination of a starting-battery and a ground-circuit normally containing it, a metallic circuit from the station to the box, a registering apparatus at the central station, devices for operating such registering apparatus, one in the ground and one in the metallic circuit, means for switching said starting-battery into either the metallic or the ground circuits, and an alarm-signal at the central station, whereby a signal is automatically given to show which circuit said battery should be switched into.

EDMUND R. WILDER.

Witnesses:
CELESTE P. CHAPMAN,
FRANCIS M. IRELAND.